May 22, 1934.　　　　　　　C. W. LAMBERT　　　　　　　1,959,631
AUTOMATIC VARIABLE PITCH PROPELLER
Filed May 11, 1933　　　3 Sheets-Sheet 3

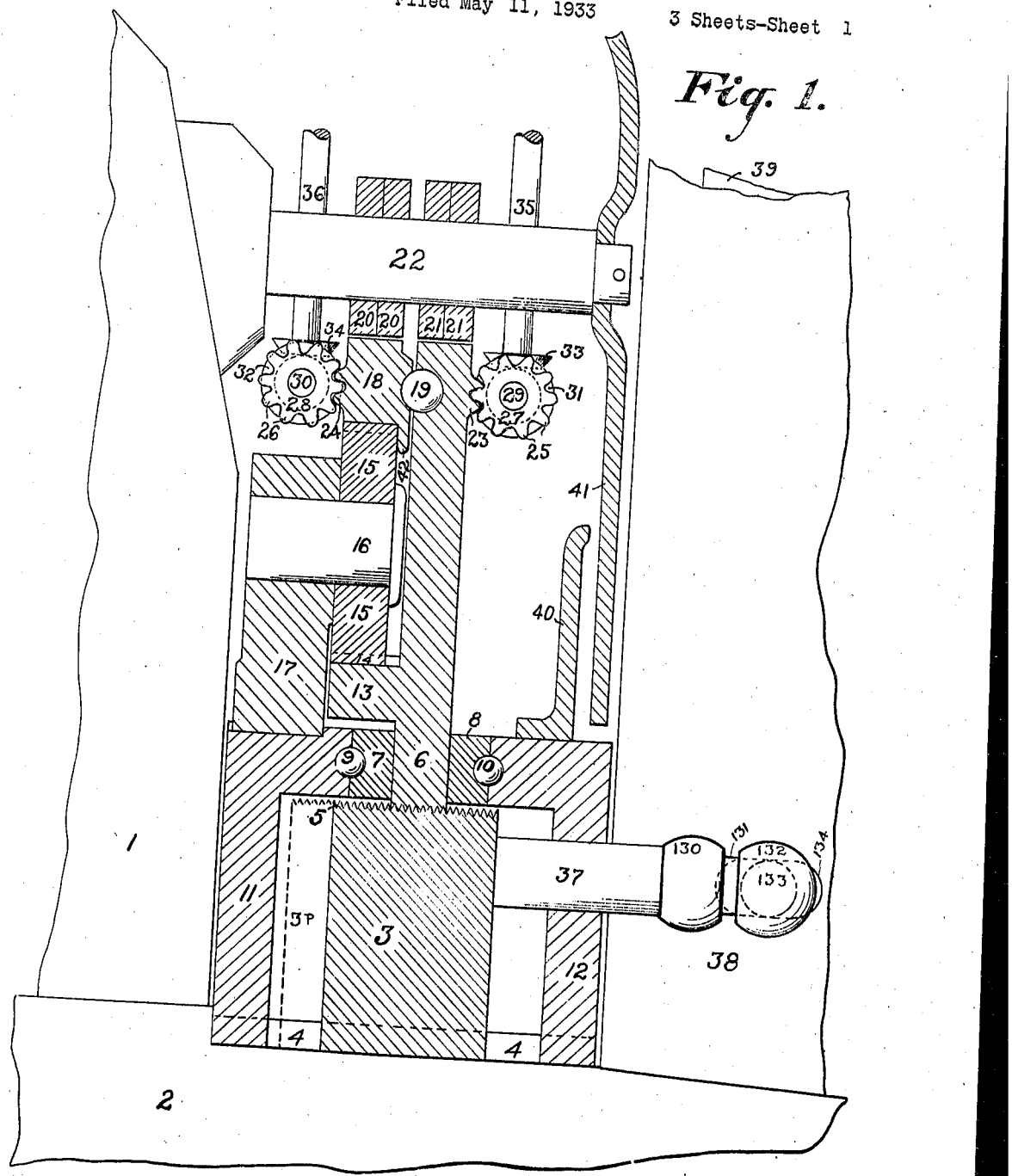

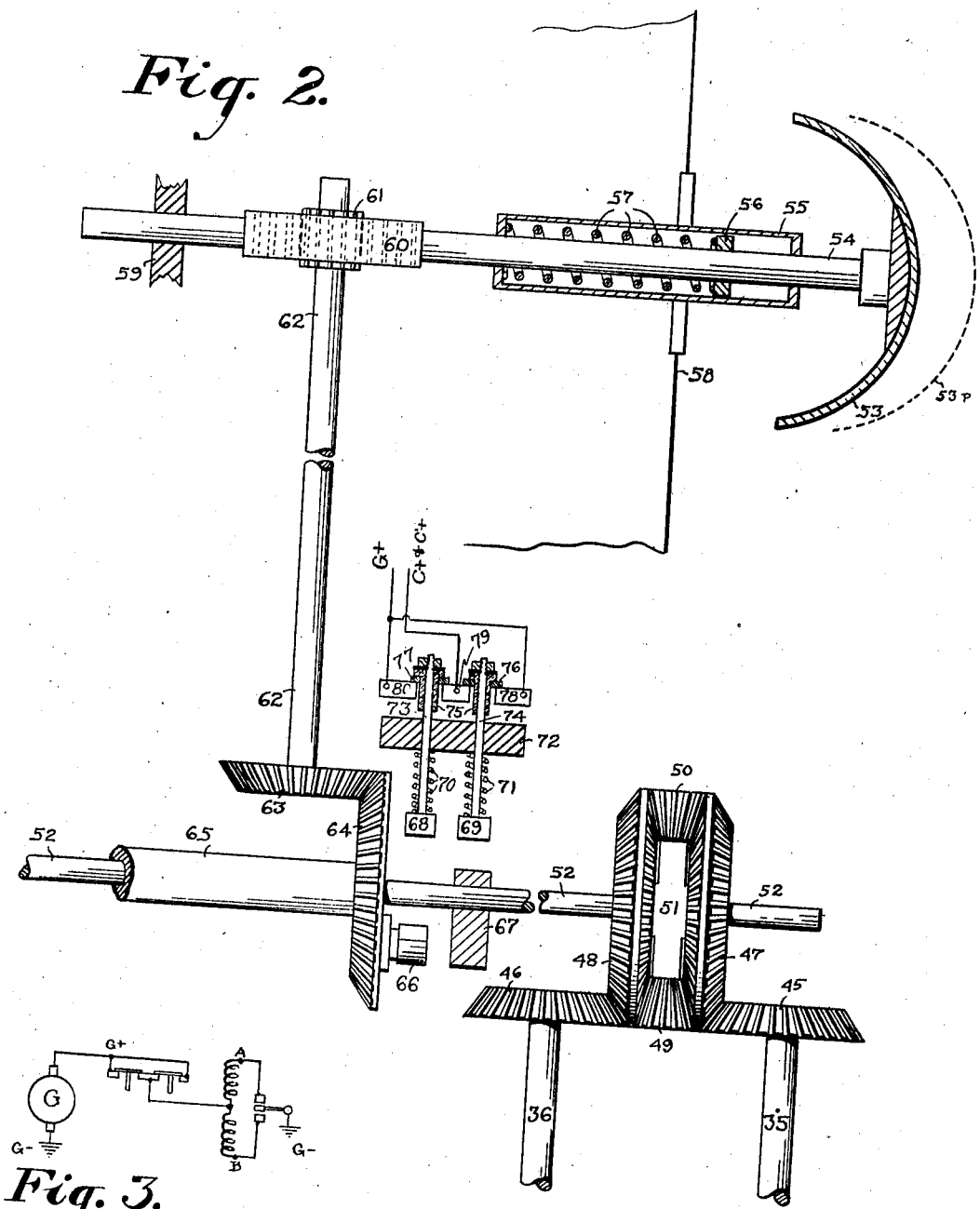

Chandley W. Lambert.
INVENTOR

Patented May 22, 1934

1,959,631

UNITED STATES PATENT OFFICE 1,959,631

AUTOMATIC VARIABLE PITCH PROPELLER

Chandley William Lambert, Cleveland, Ohio

Application May 11, 1933, Serial No. 670,521

6 Claims. (Cl. 170—162)

The invention relates to automatic variable pitch propellers comprising blades rotatably mounted in a hub, and means for rotating the blades into positions of greater or less pitch while in use, by the application of power, automatically controlled, relatively to the air speed of the craft. It is an improvement of previous application Serial No. 643,839, filed Nov. 22, 1932.

The improvement introduces greater economy of operation, space, maintenance, and adjustability, and combines a visible indicator of blade pitch.

Figure 5:
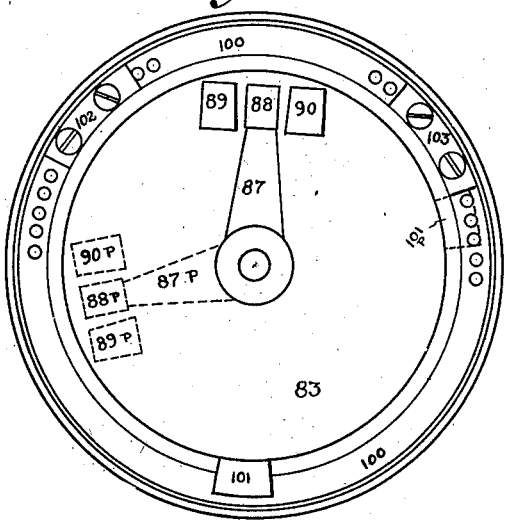
Figure 4:
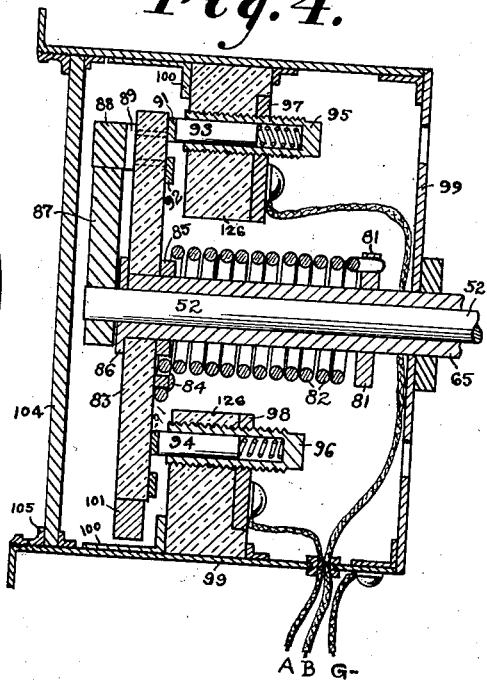
Figure 6:
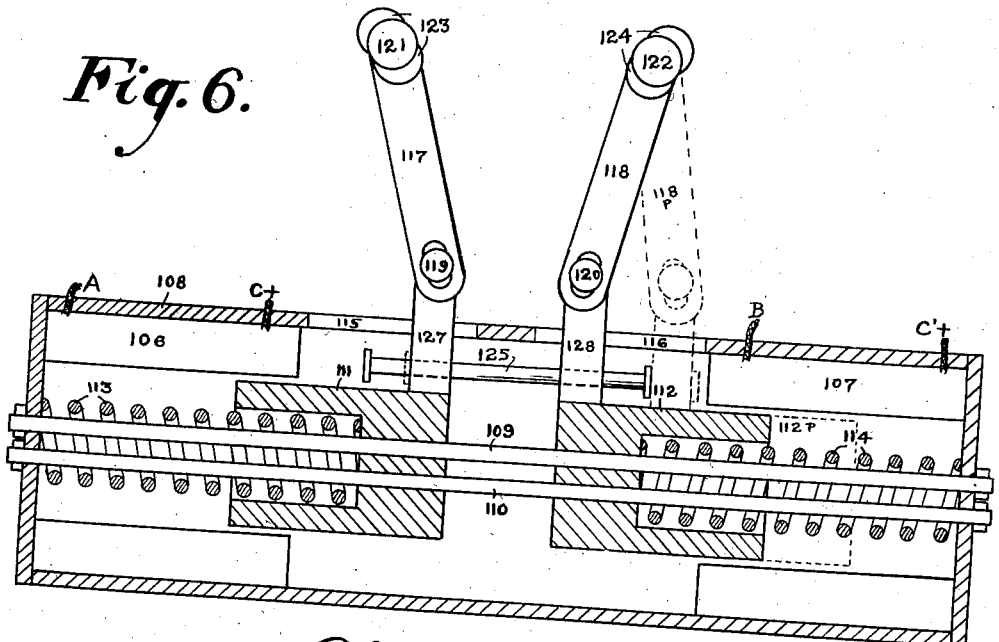

In the drawings, Fig. 1 is a vertical section on a plane through the propeller shaft. Only one half of the section is shown, as the half on the opposite side of the shaft is similar except for the non-revolving control parts as later described in Fig. 6. Fig. 2 shows the general arrangement and correlation of the control parts. Fig. 3 is a simplified diagram of the electrical control circuit. Fig. 4 is a vertical section through the selective control switch. Fig. 5 is a front elevation of the combined selective switch and pitch indicator. Fig. 6 is a vertical section, on a transverse plane, of the electro-magnetic brake operating mechanism. Similar numerals refer to similar parts throughout the several views.

In Fig. 1, 1 is a part of an engine crankcase, 2 is a propeller shaft, 3 is an annular collar longitudinally slidable in keyway 4 on shaft 2. Collar 3 is externally threaded at 5, and meshes with internal threads in wheel 6, which is held in place by thrust bearing rings 7 and 8, balls 9 and 10, and end thrust bells 11 and 12, which are secured to shaft 2. Wheel 6 has a shoulder 13, on the periphery of which teeth 14, mesh with spaced gears, one of which, 15, on pin 16, is carried by bracket 17, which is secured to end bell 11. Gear 15 meshes with combined internal ring gear and brake drum 18, which is kept parallel to wheel 6 by annular ball and race 19 and annular flange 42.

20—20 and 21—21 are the overlapping halves of external contracting brake shoes pivoted on fulcrum pin 22. These brake shoes are operated by cam levers and electro-magnets, Fig. 6, which may be located near the lower extremity of wheel 6, below the shaft 2, Fig. 1.

On the sides of wheel 6 and ring 18, Fig. 1, are spiral teeth 23 and 24 meshing with teeth 25 and 26 of gears 27 and 28 on short transverse shafts 29 and 30, on which bevel gears 31 and 32, mesh with gears 33 and 34 on shafts 35 and 36, respectively.

The spiral teeth 23 and 24 are so arranged that shafts 35 and 36 revolve slowly in the same direction, viewed from above, and at the same speed except when the blade pitch is changing.

Secured to slidable collar 3 is a push-pull rod 37. There is one such rod for each propeller blade. Rod 37 is connected by joints 130 and 132 and link 131 to radial lever arm 133 which passes through closed slot 134 in hub 38 and is secured to shank 39 of the propeller blade.

Annular ring 40 and cowling 41 enclose the apparatus and protect it from injury, and form a streamlined shape which may be increased by a conical boss on the hub forwardly of the propeller blades.

In Fig. 2, the shafts 35 and 36, above mentioned, have gears 45 and 46, which mesh with two faced bevel gears 47 and 48, the inside face gears of which mesh with gears 49 and 50, which are loose on the arms of collar 51, which collar is secured to shaft 52. Gears 47 and 48 are loose on shaft 52. In operation shaft 52 rotates less than one full turn because of the speed reduction gear train to which it is connected. Spiral teeth 25 and 26 are in effect worm gears acting on gears 27 and 28. Further speed reduction may be obtained by making gears 31 and 32 smaller than gears 33 and 34, and gears 45 and 46 smaller than gears 47 and 48. The slow speed of shaft 52 is desirable in order to keep the angular movement of switch arm 87 (Figs. 4 and 5) and plate 83 within the bounds of limiting stops 102 and 103, as later explained. When the pitch is changing, shaft 52 rotates clockwise or counterclockwise as later explained.

53 is a pressure plate secured to shaft 54, which slides in box 55, within which shoulder 56 is secured to shaft 54. Compression spring 57 bears against collar 56 and the rear end of box 55, which box at 58 is secured to the leading edge of a wing, or other place where plate 53 is acted upon by undisturbed air.

Shaft 54 has a guide bearing at 59. A rack 60, secured to shaft 54, meshes with gear 61 on shaft 62, on which gear 63 meshes with gear 64, which is secured to loose collar 65 on shaft 52. When the air-speed is increasing or decreasing, collar 65 rotates on shaft 52 through an arc of about 360° or less, and, as later explained, shaft 52, although unconnected to collar 65, tends to follow through about the same arc, nearly in synchronism, in the same direction and nearly the same extent. The angular movement of collar 65 is a measure of change of air-speed and the angular movement of shaft 52 is a measure of change of propeller blade pitch.

An adjustable cam 66 is secured to gear 64. Adjustable cam 67 is secured to shaft 52. Cams 66 and 67, at cruising speed and cruising pitch, contact followers 68 and 69, compressing springs 70 and 71, on switch operating rods 73 and 74, respectively, which pass through guide 72. Insulating bushings 75—75, on rods 73 and 74, carry contacts 76 and 77, which contact terminals 78—79 and 79—80 respectively, forming two single pole switches, which are connected in parallel into the control circuit. The cams 66 and 67 and the contact switches form an economizer of electrical energy when the air-speed and blade pitch are at the correct relation for long sustained periods of flight at regular cruising speed.

In Fig. 3 is a simplified wiring diagram of the control circuit. From "G", the generator or source of supply, the circuit divides through the economizer contactors which are connected in parallel. The magnetic coils are connected in parallel, but the single pole double throw selective switch prevents both coils being energized at the same time.

In the selective switch, Figs. 4 and 5, shaft 52 and collar 65 enter through a bearing in casing 99. Collar 65 has a fixed collar 81 in which one end of torque spring 82 is secured. The other end is secured by pin 84 to insulating plate 83 which is loose on collar 65 between fixed collar 85 and shoulder 86. To shaft 52 is secured switch arm 87, the position of which is an indication of the propeller blade pitch at the instant pertaining.

To arm 87 is secured contact point 88 which may be contacted by contact 89 or 90, according as to whether the air speed is increasing or decreasing. Contact 89 is connected electrically to slip ring 91, and contact 90 to ring 92, on the back of insulating switch plate 83.

Slip rings 91 and 92 contact brushes 93 and 94, respectively, in brush holders 95 and 96, which are in electrical contact with terminals 97 and 98, which contacts are secured to annular insulating brush holder ring 126, which is secured in casing 99 by annular ring 100.

Stop 101, Fig. 5, is secured to plate 83. Stop 101 may contact adjustable limiting stops 102 or 103 which are secured to ring 100. The casing 99 is designed to be secured into an instrument panel. The front of casing 99, Fig. 4, is closed by glass plate 104, secured by ring 105.

In Fig. 6, electromagnetic coils 106 and 107 are secured within casing 108 through which rods 109 and 110 form guides for movable armatures 111 and 112 which may be drawn into coils 106 and 107 respectively, against the force of compression springs 113 and 114. Extension arms 127 and 128 are secured to slidable armatures 111 and 112, and extend through closed slots 115 and 116 respectively in casing 108.

Pins 119 and 120, on arms 127 and 128, pass through closed slots in lever arms 117 and 118, which arms are secured to pins 121 and 122 on which cams 123 and 124 respectively operate the external contracting brake shoes 20—20 and 21—21 of Fig. 1.

Through arms 127 and 128, Fig. 6, is slidable rod 125, forming a mechanical interlock, which is short enough to prevent simultaneous application of the brake shoes to wheel 6 and ring 18 of Fig. 1.

The invention operates as follows; assume the collar 3, Fig. 1, to be in the position of minimum pitch for a particular installation, as shown by the broken line 3P near end bell 11. Also assume the plane to be on the ground and ready to take off. Since the air-speed is zero, when on the ground in still air, the pressure plate 53, Fig. 2, is pushed forward to the right) to the extreme position shown by the broken line 53P. Also the plate 83 and arm 87, Fig. 5, are rotated to the left, and contacts 88—89—90 are in the positions 88P—89P—90P, as shown by the broken lines. Stop 101 is against stop 103, shown at position 101P.

When the plane gathers air speed on the take off, air pressure on pressure plate 53, Fig. 2, compresses spring 57, rotates shaft 62 and collar 65, and also, Fig. 4, produces a torque in spring 82 conecting collar 65 and switch plate 83. This brings contact 89 against contact 88 of Fig. 5, completing the electrical circuit through one of the electromagnetic braking coils, say coil 107, Fig. 6, drawing the armature 112 into the coil, compressing brake release spring 114, moving arm 128 and rod 125 to the right, swinging arm 118 on pivot 122, and by this action cams 124 contract the external braking shoes 21—21, Fig. 1, on to wheel 6, which is slowed down below propeller shaft speed. Keyway 4 acting on collar 3 and the threads 5 reacting on the internal threads of wheel 6, cause collar 3 to move toward the right, rotating propeller blade 39, by radial arm 133, into a position of slightly higher pitch. This movement rotates arm 87, Fig. 5, to the right in clockwise direction, and contact 89 leaves contact 88, opens the circuit thru coil 107, and allows spring 114, Fig. 6, to release the brake shoes 21—21 from wheel 6, Fig. 1.

Movement of switch arm 87 coincides with the change of blade pitch as follows;—In Fig. 1, when the air-speed has been increased and blade pitch is increasing, the brake 21—21 is applied to wheel 6 as previously described. Wheel 6 is now revolving at a slower speed than the shaft 2, collar 3, and end bells 11 and 12. Since bracket 17 is also carried around at shaft speed and with it pin 16 and gear 15, it follows that ring gear 18 is accelerated above shaft speed correspondingly as wheel 6 is retarded.

Gear 28 is now speeded up and gear 27 retarded. Differential gears 49 and 50 are now rolling around on the inside faces of gears 47 and 48, and shaft 52 is slowly turning. This movement is transmitted to switch arm 87, Figs. 4 and 5, and soon the contact between 88 and 89 is broken.

Similarly, decrease of air speed causes 90 to contact 88, energize coil 106, Fig. 6, set brakes 20—20, Fig. 1, on ring gear 18, accelerate wheel 6, move collar 3 to left and reduce propeller pitch until the arm 87 moves to left, opening contact 88—90.

At cruising speed and cruising pitch, cams 66 and 67 open contacts 78—79 and 79—80, Fig. 2, and a change of air speed corresponding to the arc of face of cam 66 is allowable without cutting in the electrical control circuit. This operates as an economizer of electrical energy when cruising for a considerable distance at an economical cruising speed. When operating in this condition, any considerable change of air speed, above or below cruising speed, immediately closes contacts 79—80, and blade pitch changes correspondingly.

I claim;

1. A propeller shaft, a slidable collar on said shaft, a wheel cooperating with said collar, means comprising reversing gears and brake shoes for revolving said wheel in reverse directions relatively to said shaft, means for operating said brake shoes cooperatively with changes of airspeed so that the angular displacement of said wheel relatively to said shaft is a measure of relative changes of air speed.

2. A propeller shaft, a longitudinally slidable collar on said shaft, external threads on said collar, a wheel cooperating with said threaded collar, annular thrust bearings cooperating with said wheel, annular end bells, secured to said shaft, cooperating with said thrust bearings, a shoulder comprising an external ring gear secured to said wheel, spaced gears cooperating with said external ring gear, an internal ring gear cooperating with said spaced gears, brake shoes cooperating with said wheel and said ring gear, control means differentially operable by said wheel and said ring gear, a slidable pressure plate cooperating with said control means, means for operating said brake shoes cooperatively with said control means.

3. A propeller shaft, a hub secured to said shaft, a propeller blade shank rotatable in said hub, a slidable collar on said shaft, cooperative means connecting said shank to said collar, a brake wheel cooperating with said collar, reversing means comprising gears and a brake drum cooperating with said wheel, brake shoes cooperating with said drum and said wheel, spiral gear teeth on said wheel and said drum, differential gears cooperating with said spiral gears, a selective control switch cooperating with said differential gears, a movable pressure plate, flexible connecting means cooperating with said pressure plate and said control switch, electromagnetic brake operating coils cooperating with said selective control switch and said brake shoes, an electrical control circuit cooperating with said selective control switch and said electromagnetic coils, an economizer switch cooperating with said control circuit, economizer switch operating means cooperating with said pressure plate and said differential gears.

4. A propeller shaft, a propeller hub secured to said shaft, rotatable blades cooperating with said hub, a brake wheel cooperatively associated with said shaft, cooperative means connecting said wheel and said blades, reversing means comprising gears and a brake drum cooperating with said wheel, control means differentially operable by said wheel and said drum, airspeed measuring means cooperating with said control means, selective brake operating means cooperating with said control means and said wheel and said drum.

5. A propeller shaft, a hub secured thereon, rotatable blades in said hub, a slidable collar on said shaft, means operatively connecting said collar and said blades, a reversible brake wheel cooperating with said collar, thrust bearings associated with said wheel, brake operated reversing means cooperatively associated with said wheel, brake shoes cooperating with said wheel and said reversing means, differential gears operatively associated with said wheel and said reversing means, air speed measuring means cooperating with said differential gears and a selective control means operatively associated with said brake shoes.

6. A propeller shaft, a longitudinally slidable collar on said shaft, a hub on said shaft, rotatable blades in said hub, a reversible brake wheel threaded on said collar, thrust bearings cooperating with said wheel, brake operated reversing means for said wheel, brake shoes cooperating with said wheel and said reversing means, differential gears operably connected to said wheel and said reversing means, a movable pressure plate, actuated by air pressure generated by forward speed, a selective switch and an economizer switch cooperating with said differential gears and said plate, electromagnetic coils having movable armatures to which are connected brake shoe operating levers and cams, an electrical control circuit connecting said selective switch, said economizer switch, and said coils, means preventing simultaneous application of said brake shoes to said wheel and said reversing means.

CHANDLEY WILLIAM LAMBERT.